United States Patent [19]

Bergman

[11] 4,354,796
[45] Oct. 19, 1982

[54] AIR FLOAT POWER TRANSLATION SYSTEM

[76] Inventor: Raymond A. Bergman, 107 E. Second St., Minster, Ohio 45865

[21] Appl. No.: 966,072

[22] Filed: Dec. 4, 1978

Related U.S. Application Data

[60] Continuation-in-part of Ser. No. 924,958, Jul. 17, 1978, Pat. No. 4,179,106, which is a continuation of Ser. No. 815,676, Jul. 14, 1977, abandoned, which is a division of Ser. No. 684,725, May 5, 1976, Pat. No. 4,058,885.

[51] Int. Cl.³ .............................................. B23Q 7/06
[52] U.S. Cl. ..................................... 414/676; 198/721; 269/20
[58] Field of Search ................... 406/87, 88; 414/676, 414/677, 222, 14–20, 259, 524, 525, 280, 253, 721; 198/380, 345, 717; 269/20; 104/172 BT, 162; 180/125

[56] References Cited

U.S. PATENT DOCUMENTS

| | | | |
|---|---|---|---|
| 2,073,721 | 3/1937 | Wheelock | 414/259 |
| 2,113,986 | 4/1938 | Kent | 414/259 |
| 2,839,009 | 6/1958 | Francis | 198/717 X |
| 2,984,364 | 5/1961 | Lamb | 414/676 |
| 3,266,641 | 8/1966 | Thumim | 414/19 |
| 3,457,874 | 7/1969 | Tezuka et al. | 414/676 X |
| 3,469,887 | 9/1969 | Nakahara et al. | |
| 3,693,965 | 9/1972 | Mitsengendler | 414/676 X |
| 3,822,777 | 7/1974 | Jepsen | 414/676 X |
| 3,964,355 | 6/1976 | Daniels | 269/20 X |

*Primary Examiner*—Leslie J. Paperner
*Attorney, Agent, or Firm*—Gust, Irish, Jeffers & Hoffman

[57] ABSTRACT

A power translation apparatus for an air-float fixture support system of the type including a table having an upwardly facing upper surface adapted for supporting a workpiece fixture thereon, and a pneumatic system for supplying a cushion of pressurized air between the surface of the table and the workpiece fixture so as to floatingly support the fixture thereon for virtually friction-free movement. The power translation apparatus comprises an elongated slot in the table surface, a carriage mounted in the table below the surface for reciprocal movement parallel to the table surface along the slot, a retractable pin carried by the carriage and protruding through the slot above the surface of the table so as to mechanically engage a slot or opening in the lower surface of the fixture, and a drive mechanism for translating the carriage and pin member carried thereby along the slot so as to cause the fixture to be pushed or pulled to the desired location. In one embodiment of the invention, the air-float system is positioned adjacent a mechanical conveyor system and the translating pin moves over to engage the fixture on the conveyor and translate it onto the main portion of the air-float table in the vicinity of the machine tool, for example.

9 Claims, 12 Drawing Figures

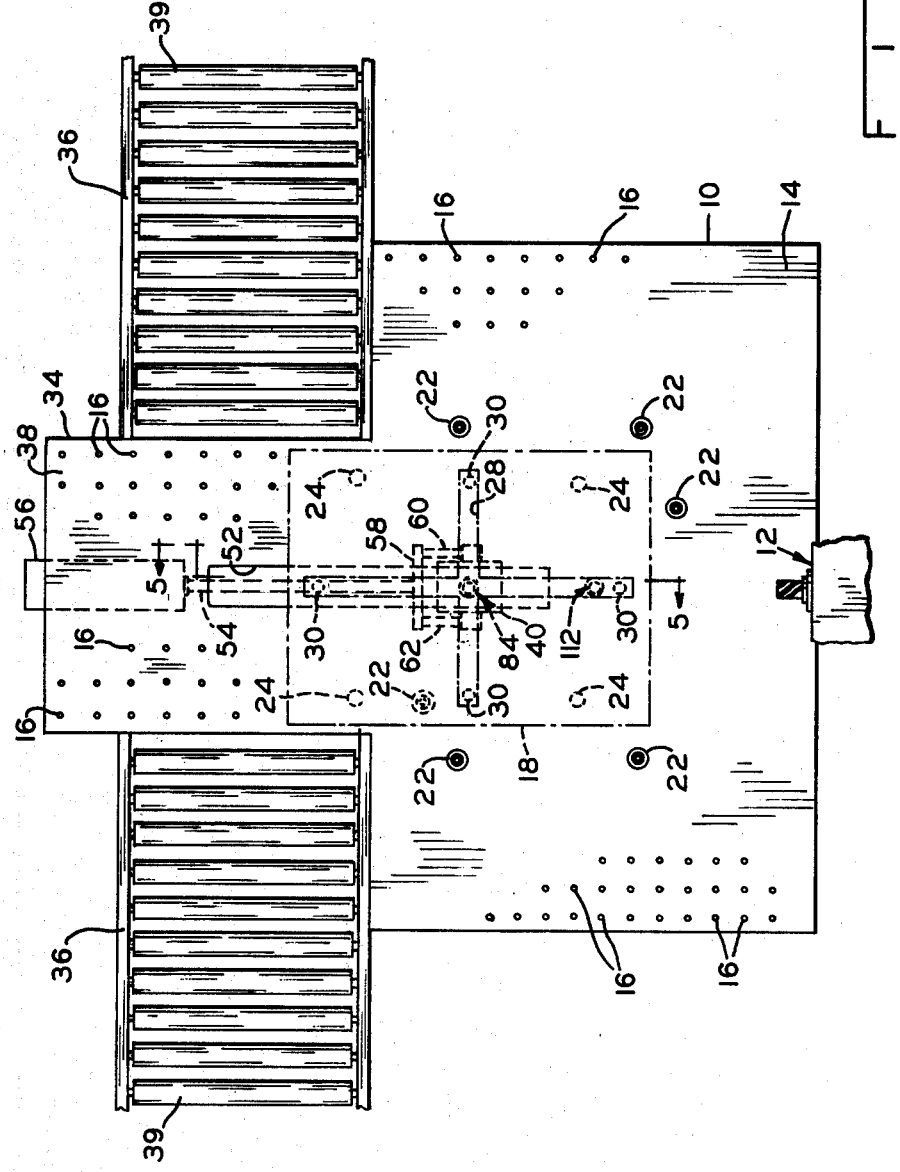
FIG—1

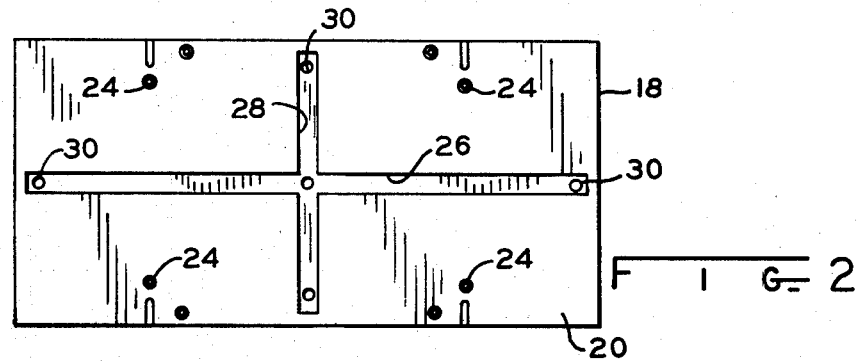
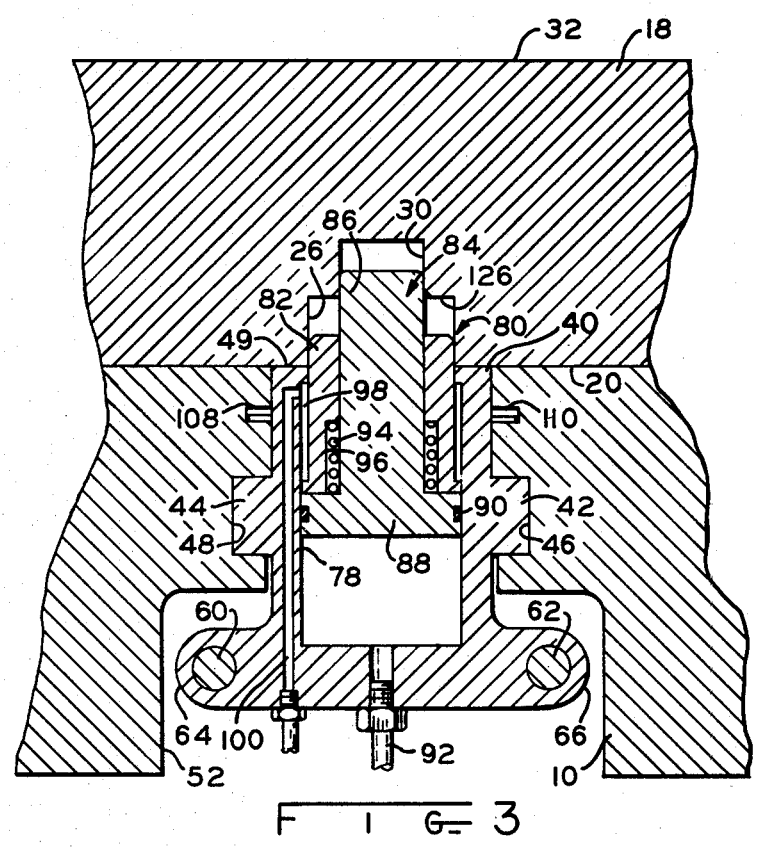

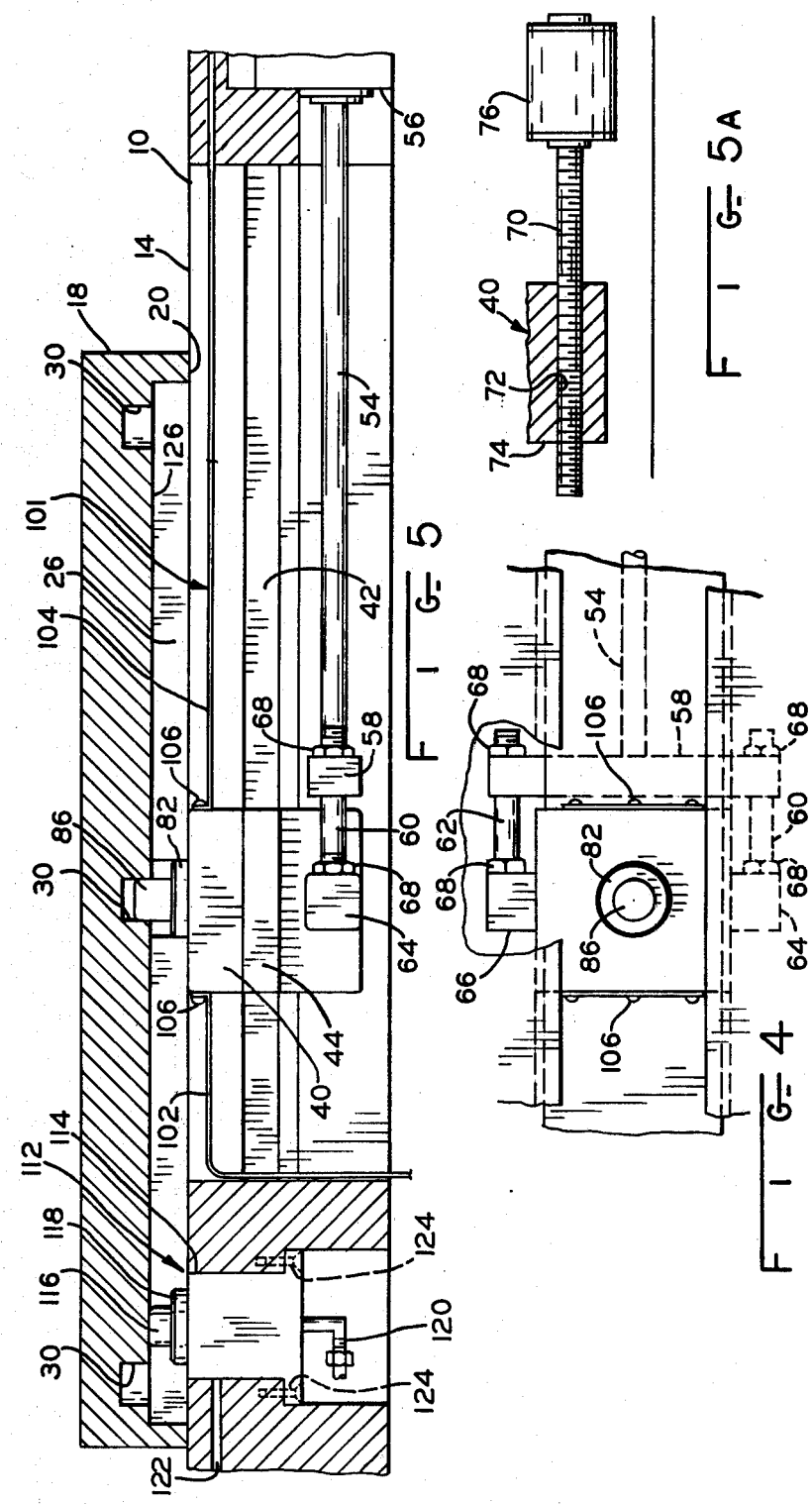

AIR FLOAT POWER TRANSLATION SYSTEM

CROSS REFERENCE TO RELATED APPLICATION

This is a continuation-in-part of application No. 924,958 filed July 17, 1978 now U.S. Pat. No. 4,179,106, which is a continuation of application No. 815,676 filed July 14, 1977 now abandoned, which is a division of application No. 684,725 filed May 5, 1976 now U.S. Pat. No. 4,058,885.

BACKGROUND OF THE INVENTION

The present invention relates to an air-float fixture support system for machine tool and other environments, and in particular to a power translation apparatus wherein the workpiece fixture may be automatically moved from one position to another on the air-float table.

In the past, the machining of large workpieces involved very difficult poisitioning and repositioning of the workpiece when the various portions thereof are machined. In many cases, it is necessary to use hoists for elevating and moving the workpiece about both to and from the machine tool table, and on the table itself where repositioning is necessary for sequential machining steps.

In order to overcome these problems, an air-float system, wherein the workpiece is mounted to a fixture which in turn is supported on a film of pressurized air, has been developed. This system is described in detail in U.S. Pat. No. 4,058,885 in the name of Raymond A. Bergman, which patent is incorporated herein by reference. In the system, a table is provided with fluid passages and a plurality of fluid outlets distributed over the surface of the table so that a cushion of pressurized air may be provided underneath the workpiece fixture. By virtue of the fluid pressure film, substantially friction-free movement of the fixture on the table is possible thereby permitting positioning and repositioning to be accomplished by a single operator without the need for hoisting equipment.

In order for the fixture to be rotated and translated from one position to another, the table is provided with one or more retractable pivot pins which project upwardly from the table surface. The pins may either be receivable in a socket in the bottom of the fixture, in which case the fixture is constrained to move circularly on the table, or, alternatively, they may be received in one or more slots so that the fixture is not only rotatable but also translatable. Cooperating pairs of retractable pin and socket locating devices on the fixture and table provide for accurate location of the fixture in a variety of predetermined positions. Clamps may also be provided for clamping the fixture in the located positions during machining. The clamps may either be of the conventional T-slot type, or, alternatively, of the bayonet type as described in pending U.S. Patent application No. 829,358 filed Aug. 31, 1977 in the name of Raymond A. Bergman.

The table may be provided with a dual centering pin feature if additional flexibility is desired in positioning and locating the fixture. The dual centering pin comprises an outer pin which is engageable with the fixture slots, and an inner pin received within the outer pin with means for causing the inner pin to extend upwardly out of the outer pin so as to engage holes in the slots. When the inner pin is retracted, the workpiece fixture is translatable on the table in engagement with the outer pin, and when the inner pin is extended and received within one of the fixture holes within the slots, the fixture may be rotated about it to the desired position.

With the advent of numerical control machine tools, there have been many advances in automating lathes, milling machines, presses and the like to the point where parts, and even tools, can be loaded and unloaded without the necessity for direct operator handling. Because of the complexity of the operations necessary for accomplishing the automated loading and unloading, however, these developments have been limited to relatively small parts and tools.

A need still remains for the automatic transport, loading and unloading of large workpieces for automatic machining wherein large parts would be translated through a machine shop and moved into and out of various machining stations under total automatic control. The heart of such a system is the ability to capture the workpiece supporting fixture plate or pallet as it reaches the appropriate machining station on a conventional conveyor system, and move it from the conveyor to the work station. The workpiece and fixture would then be moved into a positive, accurate location in the working area in order to enable accurate machining. Once in this position, conventional numerical controlled prior art machines would perform the necessary machining operations until repositioning of the workpiece is required.

Although the prior developments of the air-float system as described above have greatly facilitated the positioning and repositioning of workpieces within the tool station, manual repositioning by the operator was necessary. Furthermore, large traveling hoists are necessary for transporting the workpiece to the machine tool station, and then removing it after all the machining steps have been accomplished. This results in substantial machine down time because the operator must wait for the hoist to become available to remove the machined part, and then wait again for the hoist to become available to deliver the next part for machining. Another drawback is the inherent danger in lifting and transporting extremely heavy workpieces above the working area.

SUMMARY OF THE INVENTION

In order to overcome the disadvantages of the prior art systems, the present invention provides a power translation system wherein the workpiece fixtures are engaged by a retractable pin within the air-float table, and then translated to a new position by means of a mechanical driving system such as a hydraulic ram or feed screw. Since the translation is accomplished by a power mechanism, it may be numerically controlled so that positioning of it for any size fixture plate can be virtually automatic thereby eliminating the need for multiple pins. Power translation is also advantageous from the standpoint of repositioning extremely heavy workpieces, where a considerable amount of force is necessary to put them in motion and then stop them. By positioning the air-float table and power translation apparatus adjacent or intersecting a conventional mechanical conveyor such as a roller conveyor or belt conveyor, workpieces traveling along the conveyor from one work station to the next may be automatically pulled off the conveyor for machining and then reintroduced to the conveyor for travel to the next machining station.

Specifically, the present invention relates to an air-float fixture support system including a table having an upwardly facing upward surface adapted for supporting a workpiece fixture thereon, and means for supplying a cushion of fixture supporting pressurized air to the surface of the table whereby a workpiece fixture may be floatingly supported thereon. The improvement is a power translation apparatus comprising: an elongated slot in the table surface, a carriage mounted in the table below the table surface for reciprocal movement parallel to the table surface along a slot, a translation pin member carried by the carriage and protruding through the slot above the surface of the table, means for selectively retracting the pin member below the table surface, and a driving mechanism for translating the carriage and pin member carried thereby along the slot.

If desired, the air-float table may be positioned adjacent a conveyor for conveying workpiece fixtures along a path defined by the conveyor wherein the table intersects the conveyor and extends at least partially across the conveyor path. The carriage and pin member are translatable at least partially across the conveyor path so as to engage workpiece fixtures thereon and move them to the air-float table proper.

The invention also contemplates a method for transferring the workpiece fixture between the conveyor and table which comprises the steps of moving the fixture from the conveyor to a portion of the table adjacent thereto, mechanically engaging the fixture on the table portion adjacent the conveyor from underneath by means of a retractable pin member carried in the table surface, and translating the pin member and fixture engaged thereby across the table surface away from the conveyor. When the fixture has been moved to the table proper, the fixture is engaged from underneath by a second retractable pin carried in the table surface, and the first-mentioned pin member is retracted so as to disengage the fixture therefrom. The opposite sequence of steps will take place for moving the fixture from the air-float table back to the conveyor.

It is an object of the present invention to provide a power translation apparatus for an air-float system wherein the centering pin and workpiece fixture may be positioned without the necessity for operator intervention, thereby enabling the use of a numerical control system.

A further object of the present invention is to provide a power translation apparatus for an air-float system wherein the workpiece fixture may be automatically withdrawn from an on-line conveyor system, positioned for machining on the air-float table, and then returned to the conveyor system for transfer to the next machining station.

These and other objects and features of the present invention will become apparent from the detailed description, considered together with the accompanying drawings.

BRIEF DESCRIPTION OF THE DRAWINGS

FIG. 1 is a plan view of an air-float system and power translation apparatus according to the present invention;

FIG. 2 is a bottom plan view of the workpiece fixture;

FIG. 3 is a sectional view of the power translation pin of the present invention;

FIG. 4 is a plan view of the power translation centering pin of FIG. 3;

FIG. 5 is a sectional view taken along line 5—5 of FIG. 1;

FIG. 5a is a fragmentary view, partially in section, of an alternative embodiment of the power translation centering pin shown in FIGS. 4 and 5.

DETAILED DESCRIPTION

Figure 6A:
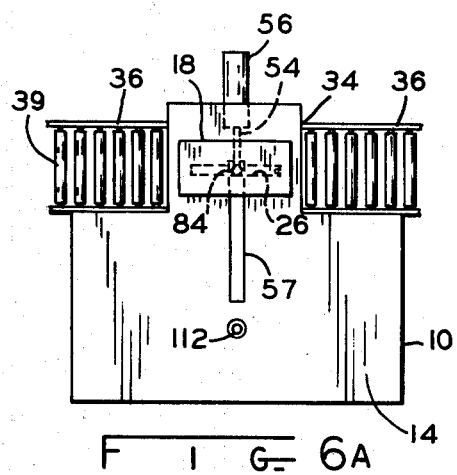
FIG. 6A is a diagrammatic plan view of the present invention showing the fixture plate positioned on the table in line with a conveyor.

Referring now to the drawings, there is illustrated in FIG. 1 an air-float machine tool table 10 positioned in front of machine tool 12. Table 10 is generally of the type described in the aforementioned U.S. Pat. No. 4,058,885, and has a planar upper surface 14 provided with a plurality of openings 16 distributed over the surface of the table 10 and having ball check valves (not shown) seated therein. The ball check valves protrude slightly above surface 14 so as to be contacted and depressed by the fixture plate 18 when it is positioned thereover. When this occurs, fluid pressure supplied to the openings 16 passes past the ball check valve and establishes a cushion of pressurized air between the lower surface 20 of fixture plate 18 and the upper surface 14 of table 10. This cushion of pressurized air is sufficient to pneumatically support fixture plate 18 to the point where it "floats" above table 10 and may be moved about relatively friction free.

Air-float table 14 is also provided with a plurality of tapered locating pins 22, which are either hydraulically or pneumatically actuated to protrude above table surface 14 and engage corresponding tapered sleeves 24 in the lower surface 20 of fixture plate 18 so as to accurately locate fixture plate 18 and the workpiece (not shown) mounted thereon in position for machining by tool 12. To release fixture plate 18, locating pins 22 are retracted into table 10 beneath the upper surface 14. That permits fixture plate 18 to be moved about on table 10 to any desired position within the limits permitted by the slots in the fixture plate. As indicated previously, this type of air-float table is described in detail in U.S. Pat. No. 4,058,885, which patent is incorporated herein by reference.

Fixture plate 18 is shown in greater detail in FIG. 2 and is seen to comprise a relatively rectangular steel plate having a pair of intersecting slots 26 and 28 in its lower surface with holes 30 located at the ends and intersection of slots 26 and 28. The upper surface 32 of fixture plate 18 is adapted to have a workpiece, such as a part to be drilled or milled, clamped or bolted thereto. Any number of tapered bushings 24 may be provided on the underneath surface 20 of fixture plate 18, depending on the variety of locating positions which are necessary for the particular machine tool machine tool station. Slots 26 and 28 are dimensioned to receive retractable centering pins so that fixture plate 18 may be translated on table 10.

Returning to FIG. 1, table 10 is generally T-shaped and includes a narrower portion 34 extending between two sections of a roller conveyor 36. The surface 38 of narrow portion 34 is at approximately the same level as the upper surfaces of rollers 39 so that a workpiece fixture 18 traveling down conveyor 36 will be able to pass onto the narrow portion 34 of table 10 in an unobstructed manner.

The power translation apparatus according to the present invention, which is shown in detail in FIGS. 3, 4 and 5, comprises a cast iron carriage 40 having a pair of protruding slide portions 42 and 44, which are received in elongated slots 46 and 48, respectively, so that it is capable of reciprocal sliding movement within table 10 in a direction parallel to the upper surface 14 of table 10. It will be appreciated that the upper surface 49 of carriage 40 is substantially flush with the upper surface 14 of table 10 so that it will not interfere with the free movement of fixture plate 18 thereon. Carriage 40 is received within the slot 52 cut through table 10, which slot is shaped to generally conform to the shape of carriage 40 and extends from a position near tool 12 to a position approximately in the center of the narrow portion 34 of table 10, which extends across conveyor 36. Obviously, slot 52 defines the traverse length for carriage 40.

Carriage 40 is reciprocated by means of a hydraulic ram comprising rod 54, which is extended and retracted by means of a hydraulic cylinder 56. Connected to rod 54 is a cross member 58 to which a pair of pusher arms 60 and 62 are rigidly connected. Pusher rods 60 and 62 are threadedly connected to a pair of ears 64 and 66, and lock nuts 68 prevent pusher rods 60 and 62 from turning in locking ears 64 and 66 and cross member 58. As the rod 54 of the hydraulic ram is extended and retracted by hydraulic cylinder 56, carriage 40 will be correspondingly advanced and retracted along slot 52.

In an alternative embodiment, (FIG. 5A) the hydraulic ram may be replaced by a feed screw 70, which passes through and is threadedly engaged with a threaded bore 72 in the lower portion 74 of carriage 40. As feed screw 70 is rotated clockwise and counterclockwise by electric motor 76, carriage 40 will be retracted and advanced in slot 52.

Received within a vertical cylindrical bore 78 in carriage 40 is a dual centering pin 80 of the general type disclosed in the aforementioned U.S. Patent application Ser. No. 835,826 filed Sept. 22, 1977. Centering pin 80 comprises an outer pin 82 which is slidably received in bore 78 and an inner pin 84 comprising a smaller diameter upper portion 86 and a lower flange 88 provided with an annular seal 90. Inner pin 84 by virtue of flange 88, which serves as a piston, is reciprocally received within bore 78 and is extended by fluid pressure, either hydraulic or pneumatic, admitted into bore 78 through fluid line 92. A compression spring 94 is disposed between flange 88 and a counterbore 96 in outer pin 82. Spring 94 serves to extend outer pin 82 upwardly when inner pin 84 is also extended. Outer pin 82 is retracted by means of fluid pressure admitted to annular chamber 98 through passageway 100. Pins 82 and 86 are preferably slightly tapered on their distal ends to compensate for any misalignment with slot 26 and opening 30, respectively, when they are projected in place.

In order to prevent chips, lubricant and the like from falling into slot 52 where they are likely to cause damage to the translating mechanism, a dust cover 101 is provided comprising two flexible strips 102 and 104 of spring steel fastened to carriage 40 by screws 106 and slidably received in a pair of elongated slots 108 and 110 positioned above and running generally parallel with slots 46 and 48. The dust cover 101 is carried by carriage 40 as it traverses within slot 52, and, as can be seen in FIG. 5, the flexible nature of dustcover 101 enables it to be bent downwardly at the end of slot 52 where it may be taken up by a spring-loaded spool (not shown) or the like.

A stationary dual centering pin 112 is mounted within table 10 at or near the center thereof so that the fixture plate 18 can be engaged for controlled movement on table 10 once it is released by the movable translation centering pin 80. Pin 112, which is very similar to pin 80 except that it is stationary rather than reciprocating, comprises a housing 114 within which inner and outer pins 116 and 118, respectively, are reciprocally received. Line 120 supplies fluid pressure for extending inner pin 116 and line 122 supplies fluid pressure for retracting outer pin 118. Inner and outer pins 116 and 118 are dimensioned so as to engage openings 30 and slots 26 and 28, respectively. Screws 124 retain housing 114 in place.

In operation, fixture plate 18, with its workpiece (not shown) clamped or bolted thereto, is floated on a cushion of air supplied between fixture plate 18 and the upper surface 14 of table 10. By admitting fluid pressure, either pneumatic or hydraulic, to bore 78 through fluid line 92, inner and outer pins 86 and 82 will be projected upwardly. When fluid pressure is released from line 92, inner pin 86 will be retracted by compression spring 94 so as to leave only outer pin 82 in a projected state. If one of the slots 26 or 28 is positioned above outer pin 82 when the pins are projected outer pin 82 will be received therein so as to mechanically confine the fixture plate 18 thereby preventing its sliding off table 10.

In order to lock fixture plate 18 for rotation about a specific center, fluid pressure is again admitted to bore 78 through line 92 thereby causing inner pin 86 to be urged against the upper surface 126 of slot 26 or 28. When fixture plate 18 is positioned so that one of the openings 30 is located above the inner pin 86, pin 86 will then project into the opening 30 thereby establishing a center of rotation for plate 18. When it is again desired to translate plate 18, fluid pressure is released from line 92 thereby causing only inner pin 86 to be retracted. In order to retract outer pin 82, fluid pressure is admitted to annular chamber 98 through passageway 100. This completely frees fixture plate 18 for movement anywhere on table 10.

This system comprises a detection device which terminates the supply of pneumatic pressure to the surface of table 10 in the event that outer pin 82 is depressed. Obviously, there are a number of safety systems which could be employed for preventing fixture plate 18 from sliding off table 10, but such systems are not the subject matter of the present invention.

With reference now to FIGS. 6A-6F, the sequence of movements for transferring a fixture plate 18 from conveyor 36 to a machining position on table 10 will be described. As fixture plate 18 and the workpiece carried thereby are rolled down conveyor 36, pressurized air is introduced to the backsides of the ball check valves in openings 16 so that the air-float system is prepared to receive the fixture plate 18. As plate 18 begins to roll onto the narrow portion 34 of table 10, it will depress one or more of the ball check valves thereby establishing a cushion of pressurized air between the lower surface of plate 18 and the upper surface 14 of table 10. Plate 18 is then glided to a position whereby slot 26 is positioned over the translation centering pin 84. Prior to this time, inner and outer pins 86 and 82 are projected upwardly against the lower surface 20 of the fixture plate, and when slot 26 is located over outer pin 82, it projects upwardly therein so as to mechanically engage the fixture plate 18.

Figure 6B:
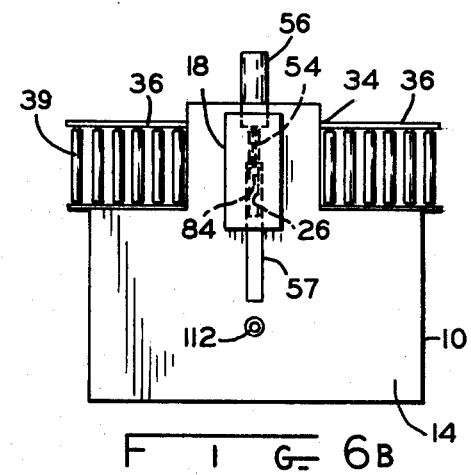
FIG. 6B is a view similar to FIG. 6A but with the fixture plate rotated ninety degrees.
Figure 6C:
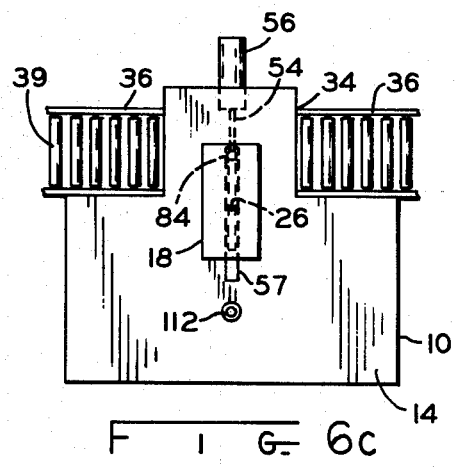
FIG. 6C is a view similar to FIG. 6B with the fixture plate being moved toward the center portion of the table.
Figure 6D:
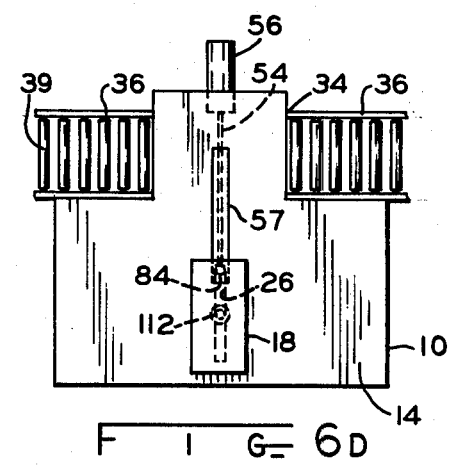
FIG. 6D is a view similar to FIG. 6C with the fixture plate captured by the pin.
Figure 6E:
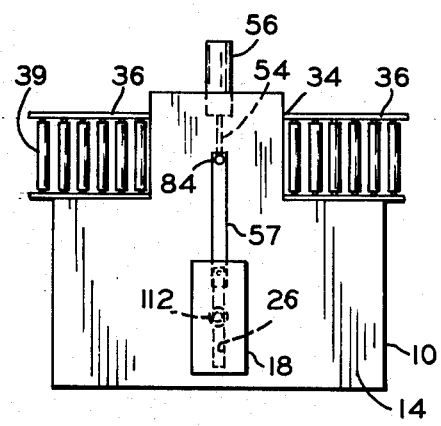
FIG. 6E is a view similar to FIG. 6D with the translating pin retracted to its original position.
Figure 6F:
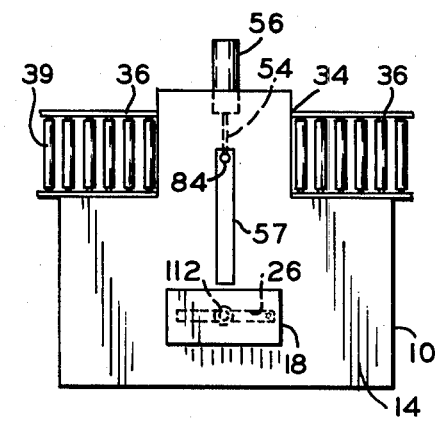
FIG. 6F is a view similar to FIG. 6E with the fixture plate rotated ninety degrees.

As shown in FIG. 6B, fixture plate 18 is rotated ninety degrees about its axis and pushed toward stationary centering pin 112 until the opening 30 at the end of slot 26 is located over inner pin 86 (FIG. 6C). Inner pin 86 will then snap upwardly into opening 30 and the system is now ready for power translation. With reference to FIG. 6D, the hydraulic ram 56 is actuated so that rod 54 advances centering pin 84 and the fixture plate 18 carried thereby to a position whereby slot 26 is located above the stationary dual centering pin 112. Inner and outer pins 116 and 118 are then projected upwardly so that the outer pin 118 is received in slot 26. The power translation pin 84 is then retracted and, if desired, withdrawn through the narrow portion 34 of table 10. If it is desired to rotate fixture plate 18 about a fixed center, the inner pin 116 is projected upwardly and fixture plate 18 is maneuvered until one of the openings 30 is located above inner pin 116. At this point, inner pin 116 will snap into place thereby establishing the center of rotation for fixture plate 18.

Subsequent to machining of the workpiece (not shown) on fixture plate 18, it is transferred back to conveyor 36 by reversing the above steps. Specifically, power translation pin 84 is advanced such that it is positioned beneath one of the slots 26 or 28, pin 84 is extended so as to engage the slot 26 or 28, stationary centering pin 112 is retracted, power translation pin 84 is translated toward conveyor 36 by hydraulic ram 56, the fixture plate 18 is rotated, pin 84 is disengaged and the fixture plate 18 is free to be pushed onto conveyor 36 for transfer to the next machining station (not shown).

Although the present invention has been described in terms of positioning a workpiece for machining, it could also be used for transporting and locating large tools for automatic loading in machinery, and could be employed in other non-machine tool environments. It is obvious that very accurate positioning of the rotation center for fixture plate 18 can be accomplished, especially in the case where a ball feed screw 70 is utilized for translation. Conventional numerical control techniques can be employed for determining the exact number of rotations of feed screw 70 to locate pin 80 in the proper position for the fixture plate size for machining. Since the fixture plates 18 are available in a number of sizes, such as 2'×4', 3'×6', 3'×8', etc., depending on the size of workpiece and machining environment, a single translatable centering pin mounted in the table 10 and extendable toward the conveyor 36 could take the place of multiple stationary centering pins in the table 10. A numerically controlled ball screw feed would be preferred for this.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. An air-float fixture support system comprising: a table having an upwardly facing upper surface, a workpiece fixture having a lower surface and being supported on said table upper surface, means for supplying a cushion of pressurized air between the fixture surface and the table surface to floatingly support the fixture thereon, an elongated slot in said table surface, a carriage mounted in said table below the table surface for reciprocal movement parallel to said table surface along said slot, said workpiece fixture having an opening in the lower surface thereof, a translation pin member carried by said carriage and protruding through said slot, means in said carriage for selectively extending said pin member to protrude above said table surface and enter the opening in the lower surface of said workpiece fixture to capture the workpiece fixture and for selectively retracting said pin member below said table surface to release the workpiece fixture, said fixture being rotatable around the axis of said pin on the cushion of pressurized air on said table while captured by said pin, and drive means for translating said carriage and said pin member carried thereby along said slot to translate said workpiece fixture when it is captured by said pin member.

2. The apparatus of claim 1 wherein said pin member comprises an outer pin and an inner pin, said inner pin being received within said outer pin for reciprocal movement in a direction generally normal to said table surface and including means for selectively causing said inner pin to project above said outer pin at a first vertical position and alternatively causing said inner pin to retract to a second vertical position below said first position.

3. The apparatus of claim 1 wherein said driving means comprises a fluid actuated ram connected to said carriage.

4. The apparatus of claim 1 wherein said driving means comprises a feed screw threadedly connected to said carriage.

5. The apparatus of claim 1 wherein said carriage is slidably received in a longitudinal second slot within said table generally below and coextensive with said first mentioned slot.

6. The apparatus of claim 1 including a dust cover slidably mounted in said table, said dust cover covering said slot and being engaged with one of said carriage and said pin member for movement therewith as said carriage and pin member translate along said slot.

7. The apparatus of claim 1 including a conveyor means for conveying first workpiece fixture along a path defined by the conveyor means, said table intersecting said conveyor means and extending at least partially across the conveyor path, said carriage and pin member being translatable at least partially across said conveyor path.

8. In an air-float fixture support system including a table having an upwardly facing upper surface adapted for supporting a workpiece fixture and means for supplying a cushion of fixture supporting pressurized air to the surface of the table whereby a workpiece fixture may be floatingly supported thereon, the improvement being a power translation apparatus comprising: an elongated slot in said table surface, a carriage mounted in said table below the table surface for reciprocal movement parallel to said table surface along said slot, a translation pin carried by said carriage and protruding through said slot above the surface of said table, means for selectively retracting said pin member below said table surface, drive means for translating said carriage and said pin member carried thereby along said slot, a workpiece fixture having a downwardly facing lower surface supported on the cushion of pressurized air supplied between said table and fixture surfaces, said fixture including an elongated slot in said lower surface in which said pin member is received, said pin member comprising an outer pin and an inner pin, said inner pin being received within said outer pin for reciprocal movement in a direction generally normal to said table surface, and means for selectively causing said inner pin to project above said outer pin at a first vertical position and alternatively for causing said inner pin to retract to a second vertical position below said first position, said fixture having a downwardly facing opening in said fixture slot, said inner pin being receivable in said opening when in said first vertical position.

9. An air-float fixture support system comprising: a table having an upwardly facing upper surface adapted for supporting a workpiece fixture, means for supplying a cushion of fixture supporting pressurized air to the surface of the table whereby a workpiece fixture may be floatingly supported thereon, an elongated slot in said table surface, a carriage mounted in said table below said table surface for reciprocal movement parallel to said table surface along said slot, a translation pin member carried by said carriage and protruding through said slot above the surface of said table, means for selectively retracting said pin member below said table surface, drive means for translating said carriage and said pin member carried thereby along said slot, a conveyor means for conveying a workpiece fixture along a path defined by the conveyor means, said table intersecting said conveyor means and extending at least partially across the conveyor path, said carriage and pin being translatable at least partially across said conveyor path, a second pin member mounted in said table out of said conveyor path and projecting above said table surface, means for selectively retracting said second pin member below said table surface, and a workpiece fixture having a downwardly facing lower surface supported on the cushion of pressurized air supplied between said table and fixture surfaces, said fixture including at least one slot in said lower surface in which said pin members are adapted to be simultaneously received.

* * * * *